Sept. 12, 1961     M. N. GLICKMAN     2,999,964
HOLDERS FOR ELECTRICAL DEVICES
Filed July 18, 1960
FIG. 1
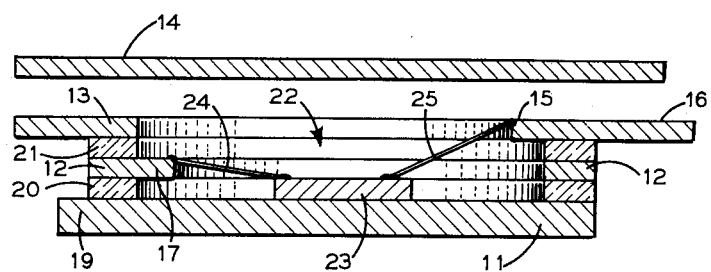
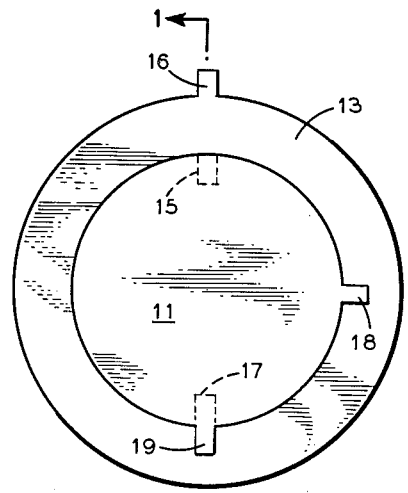
FIG. 2
INVENTOR.
Mannes N. Glickman
BY
ATTORNEY

United States Patent Office

2,999,964
Patented Sept. 12, 1961

2,999,964
HOLDERS FOR ELECTRICAL DEVICES
Mannes N. Glickman, Nutley, N.J.
(2780 Woodshire Drive, Hollywood 28, Calif.)
Filed July 18, 1960, Ser. No. 43,608
7 Claims. (Cl. 317—234)

This invention relates to holders for electrical devices, and more particularly, concerns sealed holders or casings for semi-conductor elements such as transistors, diodes or the like, as well as other electrical components.

An object of this invention is to provide an improved holder for electrical components, which is miniaturized to reduce bulk, which is adapted to achieve a high rate of heat transfer, which lends itself to quick assembly with the component to be encased and allows for testing of the device before the holder is sealed.

A further object of this invention is to provide an improved miniature casing for a transistor wherein the casing in its open condition includes integral terminal means for internal connection to the transistor and external connections for testing the encased transistor before the casing is closed.

Still another object of this invention is to provide an improved casing for electrical devices wherein the casing includes insulated wall portions which provide electrical connecting means for the encased electrical device, the wall portions lending themselves to economical assembly to form the casing and facilitating the mounting of the electrical device as well as the electrical connections thereof.

Other objects of this invention will in part be obvious and in part hereinafter pointed out.

In the drawing, FIG. 1 is a transverse sectional view taken on the line 1—1 of FIG. 2, showing a device embodying the invention; and FIG. 2 is a bottom plan view thereof.

In accordance with the instant invention, an improved holder or casing is provided for electrical components such as transistors, diodes or the like; such components being hermetically sealed therein. The casing comprises one or more annular metal plates, a metal bottom plate and a metal closure plate, wherein the bottom and annular plates form a hollow casing to receive the component to be sealed and further function as electrical terminals for internal connection to the component and for external connection in an electrical circuit.

The annular plates and the bottom plate are secured together by intervening electrical insulating layers of fused vitreous material or the like; the closure plate being applied only after the component has been mounted in the casing, the leads properly connected to the terminal plates and the assembly has been electrically tested.

Thus, as shown in FIG. 1, 10 designates a casing embodying the invention. The same comprises a thin metal bottom plate 11, which may be in circular form; a pair of thin, annular metal plates 12, 13 and a thin metal closure plate 14. Annular plate 12 has an outside diameter substantially equal to the diameter of bottom plate 11; while annular plates 12, 13 have the same inside diameter and plate 13 has an outside diameter equal to the diameter of closure plate 14 and greater than the diameter of plates 11, 12.

Annular plate 13 includes integral, radially extending electrical connecting tabs 15, 16 which project inwardly and outwardly thereof, respectively. Annular plate 12, similarly includes integral, radial tabs 17, 18. Bottom plate 11 includes an integral, radial connecting tab 19.

Plates 11, 12 and 13 are assembled in opposed relation, to form an open ended casing. Means is provided for securing the plates together while keeping the same electrically insulated from each other. To this end, thin annular layers 20, 21 of vitreous powder are suitably applied to marginal surface portions of plate 11 and plate 12. The assembly thus prepared is subjected to elevated temperatures as in an oven or the like, to fuse layers 20, 21 and thus bond the plates 11, 12 and 13 together, forming the casing with a hollow portion 22.

An electrical component, such as transistor 23 is disposed within hollow portion 22 of the casing and may be secured in place on bottom plate 11 by solder or the like, thus establishing one connection to transistor 23 through said plate 11. Through the open end of the casing, an electrical lead 24 extending from tab 17 is properly located on a selected surface portion of transistor 23 and a second electrical lead 25 extending from tab 15 is also properly located on a selected surface portion of said transistor 23.

On completing the tests of the mounted transistor 23 to establish that the leads have been properly established and that proper performance thereof may be expected, the closure plate 14 is located over annular plate 13. The outer marginal portions of plates 13, 14 are secured together in an annular zone which is laterally offset with respect to vitreous seals 20, 21, as by welding or other bonding operations. The radial projection of plates 13, 14 facilitates the welding operation.

The interior 22 of the casing 10 may be evacuated or gasified as desired, before sealing the same by cover plate 14, to provide a suitable atmosphere for element 23. Tabs 16, 18 and 19 provide means for connecting device 23 in an external electrical circuit, either for testing during the assembly of the device with holder 10, as well as in actual use after sealing.

It is understood, that when casing 10 is used to enclose and seal a diode element, only one of the annular plates will be required, in conjunction with base plate 11. Similarly, if the enclosed element should have more than three leads, the number of annular plates and intervening insulating layers of vitreous material, are correspondingly increased.

The several metal plates 11, 12, 13 and 14 may be formed of a sealing alloy known as Kovar, as well as other well known sealing alloys. The vitreous material of bonding and insulating layers 20, 21 is selected to have a thermal expansion coefficient which substantially matches that of the metal or alloy forming plates 11, 12 and 13. It is understood that closure plate 14 may be secured to plate 13 by means other than welding, as by vitreous or metallic bonding layers.

The construction of casing 10 lends itself to miniaturization, yet affording adequate surface area for heat dissipation through plates 11 or 14. Thus, plates 12, 13 and 14 may have a thickness of the order of .005" while plate 11 may have a thickness of the order of .010".

As various changes might be made in the embodiment of the invention herein disclosed without departing from the spirit thereof, it is understood that all matter herein shown or described shall be deemed illustrative and not limiting except as set forth in the appended claims.

Having thus disclosed my invention, I claim as new and desire to protect by Letters Patent:

1. A casing for an electrical device having at least two terminal leads, comprising a bottom metal plate, an annular metal plate overlying the bottom plate, an annular layer of fused electrical insulating material securing said plates together to provide a hollow open ended casing for receiving therein said electrical device, means on interior surface portions of said plates for electrical connection to the leads of said device, means on external portions of said plates providing external electrical connections and adapted to allow for electrical testing of said device in the open ended casing, and a metal closure plate secured to outer surface portions of said annular plate for sealing said casing.

2. A casing as in claim 1 wherein said annular plate and said closure plate have peripheral portions projecting beyond the peripheral portion of said bottom plate, the projecting portions of said annular and closure plates being secured together.

3. A casing for a transistor comprising a metal base plate and a pair of annular metal plates, fused vitreous material disposed between said base plate and one of said annular plates, fused material disposed between annular plates, said fused vitreous material securing said base plate and annular plates together and in electrically insulated relation, said secured plates forming a hollow open ended casing for receiving said transistor, means on said base plate and said annular plates for electrical connection to electrode portions respectively of said transistor, means on said base plate and said annular plates for external electrical connections and adapted to allow for electrical testing of said transistor in the open ended casing.

4. A casing as in claim 3 wherein said annular plates have substantially the same internal diameters, said first mentioned annular plate and said base plate having substantially the same external diameter, said second mentioned annular plate having an external diameter which is larger than the external diameter of said base plate.

5. A casing for a transistor comprising a metal base plate, a metal closure plate in opposed relation to said base plate, first and second annular metal plates between said base and closure plates, a vitreous seal between and securing the base plate and the first annular plate, a second vitreous seal between and securing said first and second annular plates, means on said base plate and said annular plates for connection to selected electrode surface portions of a transistor disposed within the hollow portion formed by said base and annular plates, means on said base and annular plates for providing connections for said transistor in an external electrical circuit, said closure plate being secured along peripheral marginal portions thereof to opposed peripheral marginal portions of said second annular plate, the secured portions of said second annular plate and said closure plate being laterally offset with respect to said vitreous seals.

6. A casing as in claim 5 wherein the marginal portion of said closure plate is welded to opposed marginal portions of the second annular plate, the welded portions of said plates being disposed outwardly of said vitreous seals.

7. A sealed casing for an electrical component having at least two terminal leads, said casing comprising a metal bottom plate, a metal closure plate in opposed relation to said bottom plate and an annular metal plate between said bottom and closure plates, an insulating seal between and securing opposed surface portions of said bottom plate and said annular plate, terminal means on interior portions of said bottom and annular plates for electrical connection to the respective leads of said electrical component, means on external portions of said bottom and annular plates providing electrical connections for an external electrical circuit, said electrical component being mounted within the hollow portion formed by said bottom and annular plates, means connecting said terminal means and the terminal leads of said electrical component, said closure plate being secured to the outer surface portions of said annular plate.

References Cited in the file of this patent
UNITED STATES PATENTS

| | | |
|---|---|---|
| 2,820,929 | Coy | Jan. 21, 1958 |
| 2,820,930 | Coy et al. | Jan. 21, 1958 |